March 29, 1966 R. F. BUNSHAH ETAL 3,243,493
METHOD AND APPARATUS FOR INDUCTION MELTING
Filed June 17, 1963

INVENTORS
ROINTAN F. BUNSHAH
ROBERT S. JUNTZ
BY
ATTORNEY 3,243,493
METHOD AND APPARATUS FOR INDUCTION MELTING
Rointan F. Bunshah, Livermore, and Robert S. Juntz, Hayward, Calif., assignors to the United States of America as represented by the United States Atomic Energy Commission
Filed June 17, 1963, Ser. No. 288,575
6 Claims. (Cl. 13—31)

The invention described herein was made in the course of, or under, Contract W–7405–ENG–48 with the United States Atomic Energy Commission.

This invention relates to the melting and casting of metals. In particular, the invention relates to a method and apparatus for melting and casting metals by induction heating.

Induction heating is commonly used to melt small quantities of metals and alloys. In the conventional induction melting process, the metal to be melted is placed in a refractory crucible, and an induction heating coil is disposed around the crucible. When high frequency current is passed through the coil, the metal within the crucible is rapidly heated to its melting point.

One of the disadvantages of conventional induction melting is that the molten metal is contaminated to some extent through contact with the crucible. This problem is eliminated by "levitating" the molten metal. No crucible is used in the levitation technique, the melt being supported and confined solely by the magnetic field of the heating coil.

Although the levitation technique eliminates the contamination problem, the current input to the heating coil must be very large in order to create a magnetic field strong enough to support the weight of the melt. Also the heating efficiency of the current is quite low, most of the current input being used up merely to lift the melt and keep it suspended.

The present invention possesses the advantages of levitation melting, while at the same time preserving the high heating efficiency of induction melting. Contamination of the melt is minimized, and relatively high current heating efficiencies are obtained. In the practice of the invention, the metal to be melted is placed on a water cooled support, and an induction heating coil is disposed around the metal. No crucible is used to contain the melt, the sole supporting structure being the water-cooled support. When high frequency current is passed through the coil, the metal is rapidly heated to its melting point. The magnetic field within the heating coil draws the molten metal up into the form of a cone, the base of which rests on the water-cooled support. The only physical contact between the molten metal and any other structure is at the interface between the melt and the water-cooled support. Contamination of the melt is thus significantly reduced as compared to conventional induction melting wherein a containment crucible contacts the melt on all sides. Furthermore, the weight of the melt is borne solely by the water-cooled support on the bottom. Once the metal is melted, the magnetic field within the coil merely confines the lateral surface of the molten cone and prevents the melt from flowing and spreading over the support. Current heating efficiency is correspondingly higher.

The invention will be described in detail with reference to the accompanying drawing, of which:

Figure 1:
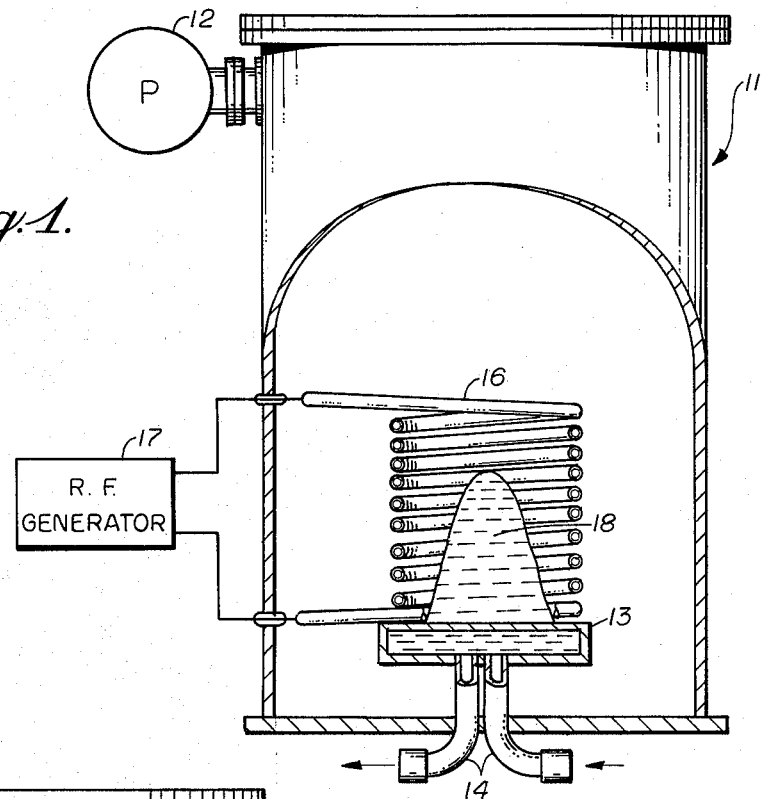
FIG. 1 is a schematic view of an induction melting apparatus.

Referring to FIG. 1, there is shown a chamber 11 which is evacuated by a vacuum pump 12. A hollow supporting stand 13 is mounted on the bottom of chamber 11, the support stand being cooled by coolant circulated via fittings 14. An induction heating coil 16 is disposed immediately above the supporting stand, and is connected to an external high frequency current generator 17. A cone of molten metal 18 is shown within the heating coil.

In the operation of the apparatus of FIG. 1, the metal to be melted is placed on stand 13, and chamber 11 is then evacuated. During the melting cycle, the residual pressure within the chamber should preferably be less than about $10^{-3}$ mm. Hg. After the chamber is evacuated, high frequency current is passed through coil 16. The current in the coil induces eddy currents in the metal to be melted, and ohmic resistance to these eddy currents rapidly heats the metal to its melting point. However, before the solid metal passes into the liquid phase, its vapor pressure is sufficiently high to cause metal atoms to escape from the surface of the solid and pass into the surrounding space. Those metal atoms which escape in a downward direction, i.e., metal atoms which are emitted by the surface in contact with the cooled support stand, are condensed at the cooled upper surface of the support stand. Thus, even before the metal is fully melted, the contact surface of the support stand becomes coated with a thin layer of condensed metal. Consequently, the molten metal never comes in contact with the support stand itself, but rather is supported by a thin layer of the same metal. Contamination of the melt by the support stand is thus virtually eliminated.

During the initial phases of melting, the metal may have a tendency to spatter. The heating coil can be protected from the spattered material by disposing a cooled shield between the melt and the heating coil. The shield should not offer a closed path for currents induced by the heating coil, otherwise "current coupling" with the coil will occur, thereby decreasing the heating effect on the melt. Current coupling can be minimized by splitting the shield longitudinally, i.e., by fabricating the shield in the form of a cylindrical shell having a longitudinal discontinuity. The necessity for using a spatter shield depends upon the nature of the metal being melted, the rate of heating, and other factors. In some cases, the melting operation may proceed smoothly enough to obviate the use of the shield.

Insoluble impurities within the metal tend to migrate to the surface during the melting operation. This migration is assisted by the spinning motion of the melt which is caused by the action of the coil's magnetic field on the molten metal (an alternating magnetic field acting on a fluid electrical conductor). The impurity migration effect can be utilized as a means to purify the melt. Once the melt has been held at temperature for a time sufficient to allow substantial migration of impurities to the surface (this time depends upon the nature of the impurities and their concentration), the current in the heating coil is gradually decreased. The gradual reduction in heating current "freezes" the melt in the form of a solid cone. The solid metal is then removed from the vacuum chamber, and the impurities are removed from the surface of the metal by mechanical or chemical means, e.g., surface grinding, tumbling, or chemical etching. After removal of surface impurities, the metal is re-melted and the sequence of steps is repeated. In this manner, a substantial purification of the metal can be achieved.

In addition to its use in melting and purifying metals, as discussed above, the apparatus of FIG. 1 can also be used to prepare metal alloys. Once the base metal is molten, small amounts of alloying metals can be added to the melt (devices for introducing materials and mechanical motion into an evacuated chamber are well known in the high vacuum art). The spinning motion of the melt helps to distribute the molten alloying metals throughout the molten base metal, thereby "homogenizing" the resulting alloy. Subsequent purification of the alloy is similar to purification of a one-component melt, as discussed above.

Figure 2:
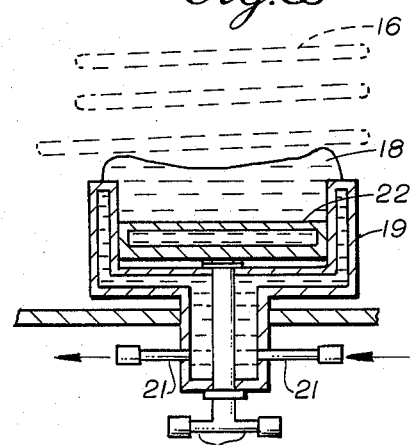
FIG. 2 is a schematic view of an induction melting apparatus adapted to directly cast the molten metal.

FIG. 2 shows a modification of the supporting stand which permits the molten metal to be cast while in the vacuum chamber. Referring to FIG. 2, there is shown a hollow-walled mold 19 through which coolant is circulated by means of fittings 21. A hollow piston 22 is movably disposed within the mold cavity, the interior of the piston being cooled by coolant circulated via fittings 23.

In the operation of the apparatus of FIG. 2, piston 22 is positioned so that its upper surface is flush with the top of mold 19. In this position, the upper piston surface and the top of the mold form a cooled continuous planar surface. The metal to be melted is placed upon this surface, the chamber is evacuated, and the current is passed through the heating coil. After the melt has been held at temperature for a sufficient time (depending upon whether the melt is being alloyed, homogenized, purified, etc.), piston 22 is drawn downward, and the molten metal flows into the mold. The first portion of the melt to flow into the cooled mold coats the walls thereof with a thin layer of solidified metal. Consequently, the remaining bulk of the melt does not come into contact with the walls of the mold, but rather contacts only the metal coating formed by the initial flow of the melt. Contamination of the melt by the mold material is thereby minimized. Once the metal has solidified within the cooled mold, the resulting ingot is recovered (the mold can optionally be constructed in two parts which are hinged together for easy ingot removal).

Figure 3:
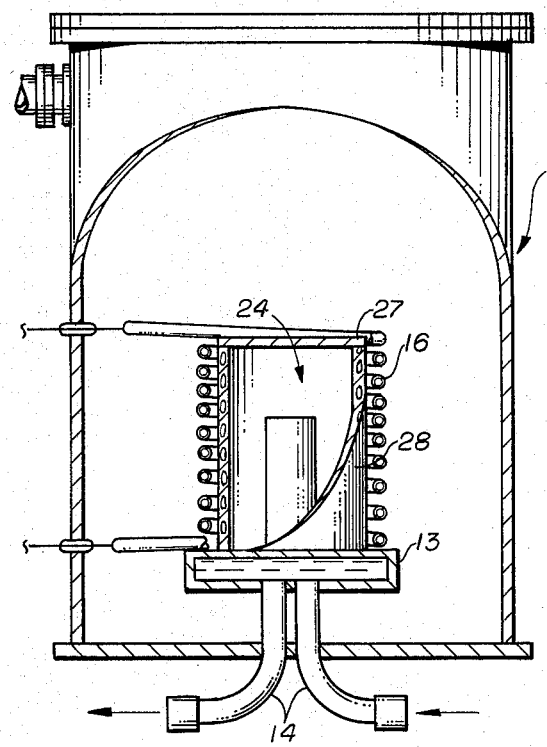
FIG. 3 is a schematic view of an induction melting apparatus adapted to distill the molten metal and collect the distillate.

FIG. 3 shows a modification of the apparatus of FIG. 1 which is adapted for metal distillation. Referring to FIG. 3, there is shown a cylindrical condensing surface 24 which is disposed between heating coil 16 and the metal ingot 26 to be distilled. The metal to be distilled will also be referred to hereinafter as the "distilland" or the "source." Condensing surface 24 is fabricated in two parts to facilitate removal of the metal distillate; a top surface 27 and a lateral surface 28. Lateral surface 28 is provided with a longitudinal slit to minimize current coupling with the heating coil. The source metal is supported by cooled support stand 13.

In the operation of the distillation apparatus, the distilland should preferably be free of impurities having a high vapor pressure, otherwise these impurities will be transported to the distillate. Such preliminary purification can be accomplished by vacuum melting the distilled prior to the actual distillation. Purification by vacuum melting has been discussed previously. The source metal is then placed on the cooled support, chamber 11 is evacuated, and current is applied to heating coil 16. When the distilland is sufficiently hot, metal atoms will escape from the surface thereof and subsequently condense on surface 24.

Contamination of the distillate through reaction with the residual atmosphere constitutes the major source of contamination. Such contamination is governed primarily by the ratio of the number of metal atoms condensing on a given area to the number of impurity atoms (from the residual atmosphere) condensing on the same area. Thus, to minimize contamination of the distillate, the distillation should be conducted at as low a pressure as possible, so as to minimize the number of atmospheric impurity atoms present within the vacuum chamber. Contamination of the distillate by the residual atmosphere can also be reduced by placing the condensing surface as close as possible to the source without actual contact. In this manner the evaporated metal atoms will be condensed immediately after escaping from the surface of the heated source, thereby having less chance of colliding with impurity atoms in the residual atmosphere.

The temperature of condensing surface 24 has an important bearing on the purity and the metallurgical characteristics of the metal distillate. A low condensation temperature minimizes reevaporation of distillate atoms, and hence results in a rapid rate of distillate condensation. A rapid condensation rate, in turn, minimizes atmospheric contamination of the distillate. On the other hand, a higher condensing temperature produces a denser and metallurgically sounder deposit. A balance must be struck between these opposing effects of high and low condensation temperatures, depending upon whether purity or density of the deposit is the paramount consideration. If necessary, condensing surface 24 can be fabricated with a cooling jacket if a rapid condensation rate is desired. Alternatively, electrical resistance heaters can be used to heat the condensing surface if a dense deposit is necessary.

As an example of the savings in input power which can be achieved with the apparatus of FIG. 1, a beryllium ingot 1.5 inches in diameter and 2 inches high was melted in 4 minutes using an input power of 5 kilowatts. It took 30 kilowatts of input power to melt a ingot of similar size using conventional levitation melting. Thus, the provision of a support for the melt effected a six-fold savings in input power.

Although several embodiments of the invention have been described above, it will be evident to those skilled in the art that other embodiments are possible within the spirit of the invention. Therefore, it is not intended to limit the invention except as defined by the following claims.

What is claimed is:
1. In a process for melting metals by induction heating, the steps comprising,
 (a) disposing a metal to be melted on a cooled supporting member,
 (b) placing said metal and said supporting member within an inert environment,
 (c) surrounding said metal with an induction heating coil,
 (d) disposing a cooled tubular shield provided with means for regulating the temperature thereof in spaced relation between said metal and said heating coil, said shield being provided with at least one generally longitudinal slit extending the full length dimension thereof,
 (e) passing current through said coil to inductively heat said metal to its melting point,
 (f) adjusting the current flowing within said coil such that the molten metal is drawn up substantially in the form of a cone, the base of said cone being supported by said cooled supporting member, and the lateral surface of said cone being constrained and supported by the magnetic field within said heating coil,
 (g) and cooling and recovering said metal.

2. In a process for melting metals by induction heating, the steps comprising,
 (a) disposing a metal to be cast on a cooled mold, said mold having a cooled piston movably disposed within the mold cavity,
 (b) placing said metal and said mold within an inert environment,
 (c) surrounding said metal with an induction heating coil,
 (d) disposing a cooled tubular shield provided with means for regulating the temperature thereof in spaced relation between said metal and said heating coil, said shield being provided with at least one generally longitudinal slit extending the full length dimension thereof,
 (e) passing current through said coil to inductively heat said metal to its melting point,
 (f) adjusting the current flowing within said coil such that the molten metal is drawn up substantially in the form of a cone, the base of said cone being supported by said cooled mold and said cooled piston, and the lateral surface of said cone being constrained and supported by the magnetic field within said heating coil, (g) partially withdrawing said piston from within said mold cavity, thereby causing said molten metal to flow into and fill said mold cavity, (h) and cooling and recovering the resulting metal casting.

3. In an apparatus for melting metal by induction heating, the combination comprising,
  (a) a chamber adapted to be evacuated,
  (b) a supporting stand disposed within said chamber, said supporting stand adapted to vertically support a metal to be melted thereon,
  (c) means for cooling said supporting stand,
  (d) an induction heating coil disposed radially horizontally around and in spaced relation to the metal to be melted on said stand,
  (e) a tubular spatter shield disposed in spaced relation within said heating coil and defining a region for receiving said metal to be melted, said shield provided at least one generally longitudinal slit extending the full length thereof,
  (f) means for regulating the temperature of said shield,
  (g) and a source of high frequency current electrically connected to said coil, said high frequency current being of such magnitude to generate horizontally oriented levitation forces sufficient to laterally support said metal when in the molten state.

4. In an apparatus for melting metal by induction heating, the combination comprising,
  (a) a chamber adapted to be evacuated,
  (b) a mold disposed within said chamber,
  (c) a piston movably disposed within the cavity of said mold, said piston and said mold adapted to vertically support the metal to be melted and cast,
  (d) means for cooling said piston and said mold,
  (e) an induction heating coil disposed radially horizontally around and in spaced relation to the metal to be melted and cast on said mold and piston,
  (f) a tubular spatter shield disposed in spaced relation within said heating coil and defining a region for receiving said metal, said shield provided with at least one generally longitudinal slit extending the full length thereof,
  (g) means for regulating the temperature of said shield,
  (h) and a source of high frequency current electrically connected to said coil, said high frequency current being of such magnitude to generate horizontally oriented levitation forces sufficient to laterally support said metal when in the molten state.

5. In a process for melting metals by induction heating, the steps comprising:
  (a) disposing a metal to be distilled on a cooled supported stand,
  (b) disposing a tubular shield-condensing surface, provided with means for regulating the temperature thereof, in spaced relation about said metal, said tubular shield-condensing surface being provided with at least one generally longitudinal slit extending the full length thereof,
  (c) disposing said metal, said supporting stand, and said tubular shield-condensing surface within a vacuum environment,
  (d) disposing an induction heating coil in spaced relation about said tubular shield-condensing surface such that the tubular shield condensing surface is interposed between the heating coil and the metal to be distilled,
  (e) passing high frequency alternating electrical current through said coil to heat said metal to at least its melting point to cause a substantial number of metal atoms to leave the surface of the metal and escape into the surrounding space, said high frequency current being of such magnitude to generate horizontally oriented levitation forces sufficient to laterally support said metal when in its molten state,
  (f) maintaining the temperature of said condensing surface at a value which will cause the majority of metal atoms impinging on said surface to condense thereon, and
  (g) recovering the resulting condensed metal distillate.

6. In apparatus for melting metal by induction heating, the combination comprising:
  (a) a chamber to be evacuated,
  (b) a tubular spatter shield providing a condensing surface disposed within said chamber, said tubular spatter shield having at least one generally longitudinal slit extending the full length thereof,
  (c) means for regulating the temperature of said tubular spatter shield-condensing surface,
  (d) a supporting stand disposed within said tubular spatter shield-condensing surface, said supporting stand adapted to vertically support a metal to be distilled thereon,
  (e) means for cooling said supporting stand,
  (f) an induction heating coil disposed radially about and in spaced relation to said tubular spatter shield-condensing surface such that said tubular spatter shield-condensing surface is interposed between said coil and a metal to be distilled on said supporting stand, and
  (g) a source of high frequency alternating electrical current connected to said coil, said high frequency current being of such magnitude to generate horizontally oriented levitation forces sufficient to laterally support said metal when in the molten state.

References Cited by the Examiner

UNITED STATES PATENTS

| | | | |
|---|---|---|---|
| 1,893,106 | 1/1933 | Ridgeway | 13—34 |
| 2,475,452 | 7/1949 | Jouannet | 13—34 |
| 2,584,660 | 2/1952 | Bancroft. | |
| 2,727,936 | 12/1955 | Boyer | 13—31 |
| 2,889,386 | 6/1959 | Gruber et al. | 13—31 X |
| 2,937,217 | 5/1960 | Baker et al. | 13—31 |

RICHARD M. WOOD, *Primary Examiner.*

ANTHONY A. BARTIS, JOSEPH V. TRUHE,
*Examiners.*

V. Y. MAYEWSKY, *Assistant Examiner.*